Nov. 30, 1965  F. E. SMITH  3,220,370
SEED PLANTER ATTACHMENT
Filed May 1 1964  2 Sheets-Sheet 1
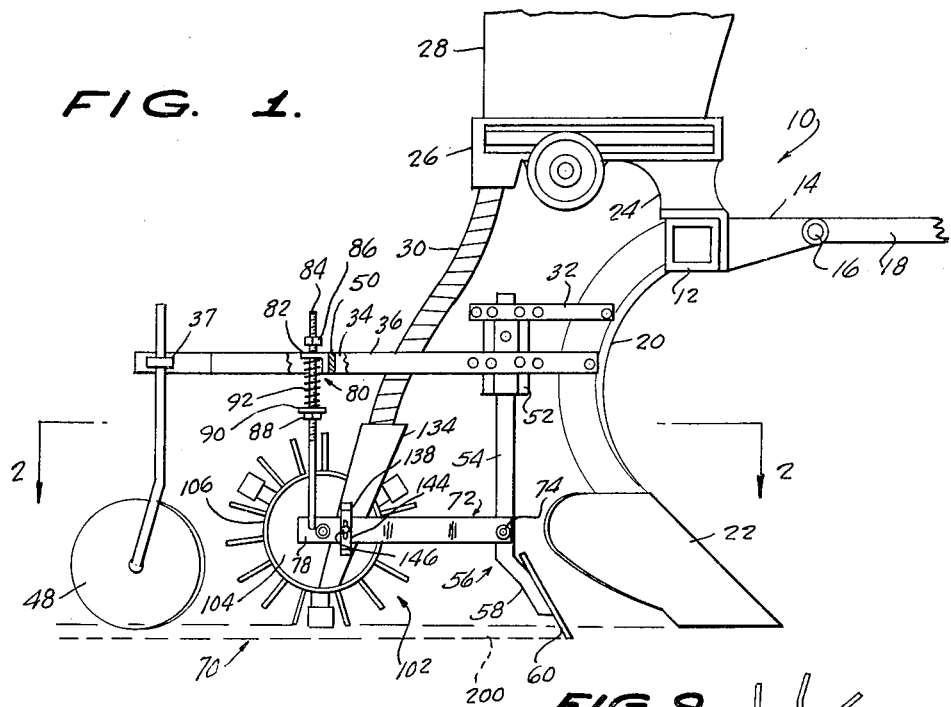
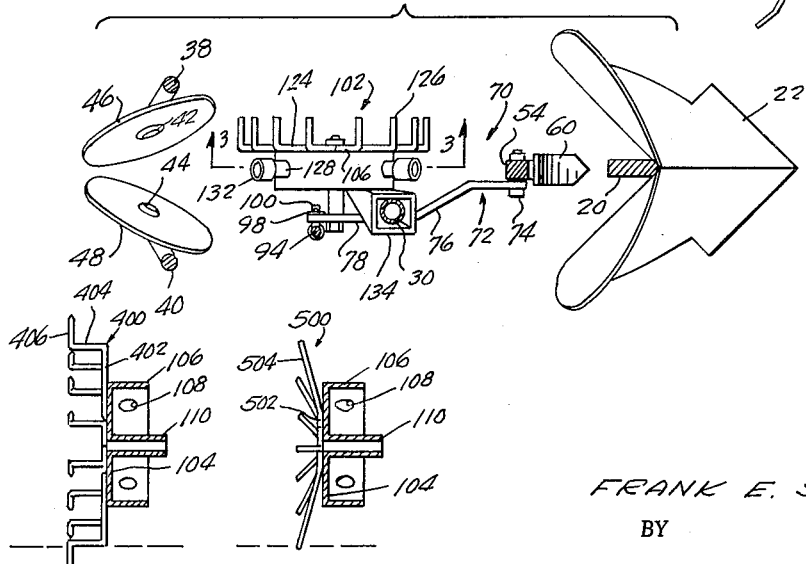
INVENTOR.
FRANK E. SMITH,
BY
McMorrow, Berman & Davidson
ATTORNEYS.

Nov. 30, 1965         F. E. SMITH         3,220,370
                 SEED PLANTER ATTACHMENT
Filed May 1 1964                          2 Sheets-Sheet 2
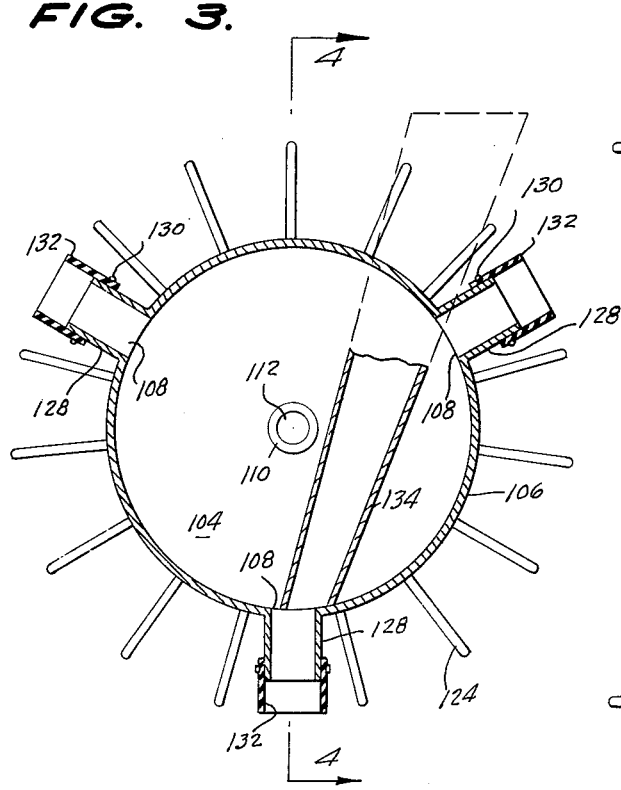
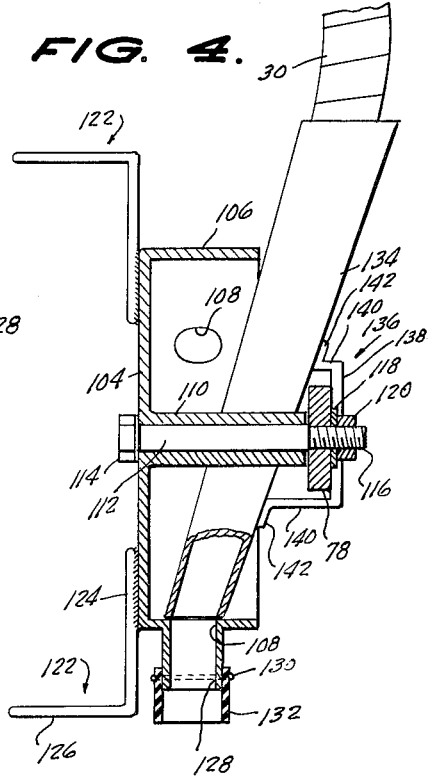
INVENTOR.
FRANK E. SMITH,
BY
McMorrow, Berman & Davidson
ATTORNEYS.

United States Patent Office 3,220,370
Patented Nov. 30, 1965

3,220,370
SEED PLANTER ATTACHMENT
Frank E. Smith, La Feria, Tex., assignor, by direct and mesne assignments, to Morris A. Traylor, La Feria, Tex.
Filed May 1, 1964, Ser. No. 364,260
2 Claims. (Cl. 111—51)

This invention relates to the general field of agricultural implements and, more specifically, the instant invention pertains to a control attachment therefor.

One of the primary objects of this invention is to provide an attachment for a seed planter for planting seeds at regular intervals in a furrow or drill.

Another object of this invention is to provide an attachment for a seed planter which will prevent the indiscriminate sowing of seeds due to the mechanical vibration of the planter or seed scattering due to wind or other adverse conditions.

A further object of this invention is to provide an attachment for a conventional seed planter which confines the seed to a preselected area in a drill and effectively prevents the bouncing thereof away from the selected area upon contact with the ground.

Still another object of this invention is to provide an attachment for a seed planter, the attachment controlling the spacing of the seeding intervals and being operable independently of the planter.

A still further object of this invention is to provide an attachment for a seed planter which, while the planter is moving, remains substantially stationary at the time the seed is discharged to the soil.

This invention contemplates the provision of an attachment for a seed-planting apparatus wherein means are provided for variably controlling the spacing between each planting.

As a further object of this invention, it is proposed to provide an attachment for a conventional seed planter which will confine the seed to a preselected area and which is self-compensatory to accommodate the attachment to arcuate space plantings under uneven soil conditions.

It is another object of this invention to provide an attachment for a seed planter which will effectively reduce the quantity of seed required to obtain maximum desired seed planting due to controlled quantity and seed location, thereby eliminating indiscriminate sowing of seeds.

A still further object of this invention is to provide an attachment for a seed planter which will eliminate the necessity of thinning growing plants due to the spacing of seed at desired regular intervals in a furrow, or drill.

The invention has, as still another object thereof, the provision of an attachment for a seed planter which effectively enhances plant growth due to conservation of ground moisture by reason of a reduced quantity of growing plants.

As a further object, it is proposed to provide an attachment for a seed planter which will conserve soil nutriment by reason of a reduced quantity of growing plants.

Yet another object of this invention is to provide an attachment for a seed planter which will increase the effectiveness of insecticides due to the controlled spacing of seed plantings, thereby permitting more direct sunlight around the base of each growing plant.

Again, another object of this invention is to provide an inexpensive attachment to convert a conventional "drill" planter into a "hill" planter.

It is a still further object of this invention to provide an attachment for a seed planter to provide precision regulating means for controlling the number of seeds planted in a hill, and wherein the attachment is of special utility in the planting of dicotyledons.

This invention has, as still another object thereof, the provision of a planter attachment of the type described which is non-complex in construction and assembly, inexpensive to manufacture and maintain, and which is rugged and durable in use.

Other and further objects and advantages of the instant invention will become more manifest from a consideration of the following specification when read in conjunction with the annexed drawings, in which:

FIGURE 1 is a side elevational view of a conventional seed planter and attachment connected thereto constructed in accordance with this invention;

FIGURE 2 is a top plan view of the seed planter and attachment shown in FIGURE 1, FIGURE 2 being taken substantially on the horizontal plane of line 2—2 of FIGURE 1, looking in the direction of the arrows;

FIGURE 3 is an enlarged detail cross-sectional view, FIGURE 3 being taken substantially on the horizontal plane of line 3—3 of FIGURE 2, looking in the direction of the arrows;

FIGURE 4 is a detail cross-sectional view, FIGURE 4 being taken substantially on the vertical plane of line 4—4 of FIGURE 3, looking in the direction of the arrows;

FIGURE 5 is a side elevational view of a second embodiment of the attachment;

FIGURE 6 is a side elevational view of the reverse side of the attachment shown in FIGURE 5; and FIGURES 7 to 9, inclusive, illustrate modifications of the construction of the attachment wheel.

Referring now more specifically to the drawings, reference numeral 10 designates, in general, a gang-type planter, of a conventional type, only one planting mechanism being shown. The planter 10 is of the type designed to plant dry seed and comprises an elongated normally horizontal substantially hollow rectangular drawbar 12 from which projects a pair of longitudinally-spaced substantially parallel tongues 14 (only one being shown) which are adapted for pivotal connection at 16 with one end of a link 18. The other end of the link 18 is connected, in the conventional manner, with motive means (not shown) as, for example, a conventional tractor. Fixedly connected to the drawbar 12 are the upper ends of a plurality of arcuately-shaped plow frames 20 (only one being shown herein), the lower ends of each of the plow frames 20 having rigidly secured thereto a plow shoe 22. Fixedly secured on the drawbar 12 and projecting upwardly therefrom is one end of a vertically-elongated standard 24, the upper end of the standard 24 supporting and being fixedly secured to a rearwardly-projecting base 26 to which is connected the lower end of the usual seed hopper 28. The base 26 has incorporated therein means for controlling the flow of seed from the hopper 28 to the seed-delivery tube 30. Since the feed-control means forms no part of this invention, the same is not illustrated herein. It will be understood that for each of the plow shoes 22 there is provided an equal number of standards 24, bases 26, hoppers 28, and seed-delivery tubes 30.

To each plow beam 20 is fixedly secured one of the ends of a pair of rearwardly-extending laterally-spaced bars 32 (only one being shown) and immediately therebelow are fixedly connected one of the ends of a second pair of laterally-spaced elongated and substantially parallel bars 34, 36. To the other end of each of the bars 34, 36 are fixedly connected, as at 37, the upper ends of a pair of shafts 38, 40, to the lower ends of which are pivotally connected, as at 42, 44, respectively, a pair of conventional rotatable furrow-closing discs 46, 48. To maintain the bars 34, 36 in their laterally-spaced relation, at least one or more spacer blocks 50 may be interposed therebetween and fixedly secured thereto.

Reference numeral 52 denotes, in general, a vertically-elongated, substantially rectangular sleeve which is fixedly secured between the pair of bars 32 and pair of bars 34, 36, the sleeve 52 being adapted to receive the upper end of the leg portion 54 of an angle member 56 having a depending foot portion 58 to which is fixedly secured a forwardly-facing furrow plow blade 60. All of the above-described structure is conventional and well-known in the art. The attachment, to which this invention relates, is set forth below.

The attachment with which this invention is concerned is designated, in general, by reference numeral 70 and is seen to comprise an elongated substantially rectangular lever 72 having one of its ends pivotally connected to the lower end of the leg portion 54 as at 74. The lever 72, intermediate its ends, is formed with a laterally-offset portion 76 which terminates, at its outer end, in a terminal end section 78 offset with respect to the offset section 76 and extending substantially parallel to the line of travel of the furrow plow blade 60.

Reference numeral 80 connotes an angle member fixedly secured to the spacer block 50, the angle member 80 having a rearwardly-projecting flange 82 in which is reciprocably mounted the threaded upper end of an elongated depending rod 84. Downward movement of the rod 84 is controlled by the limit nut 86 mounted on the threaded upper end of the rod 84 above the flange 82, and also threaded on the upper end of the rod 84 is a second nut 88 positioned below the flange 82. Supported on the second nut 88 is a washer 90, and interposed between the washer 90 and the flange 82, and surrounding the rod 84 is a helicoidal spring 92 under compression. The arrangement is such that the rod 84 is constantly biased for movement in a downward direction. The lower end of the rod 84 terminates in a laterally-offset end 94 which is pivotally connected to the outer end of the terminal end section 78 of the lever 72. As is seen in FIGURE 2, the offset end 94 extends entirely through the offset terminal end portion 78 and is secured thereto by the conventional washer 98 and cotter pin 100.

Reference numeral 102 generally indicates a wheel (see FIGURES 1, 2, 5 and 6) comprising a disc 104 from the circumferential marginal edge of which laterally-projects a substantially cylindrical drum 106. Extending through the drum 106, and disposed at regular circumferentially-spaced intervals, are a plurality of openings 108.

An elongated substantially hollow hub 110 projects centrally from the disc 104 within the drum 106. The hub 110 is rotatably mounted on an axle 112 headed at 114 at one of its ends, and threaded at 116 at its other end. As is seen in FIGURE 4, the threaded end 116 extends transversely through the terminal end section 78 of the lever 72, and the axle 112 and wheel 102 are fixedly secured on the lever 72 by means of the lock washer 118 and nut 120.

A plurality of substantially L-shaped lugs 122 (see FIGURE 4) are fixedly secured to the disc 104, the legs 124 thereof radiating from the disc 104 at circumferentially-spaced intervals. The outer end of each of the legs 124 terminates in an offset foot 126, the degree of angularity between the leg 124 and foot 126 being preferably 90°.

From the peripheral marginal edge of each of the openings 108 outwardly extends an elongated, substantially hollow, cylindrical tube 128. The outer end of each tube 128 is releasably secured by a clamp ring 130 to one end of a substantially hollow cylindrical flexible seed-discharge nozzle 132. The nozzle 132 is preferably formed of rubber, but other suitable flexible materials could be substituted therefor, if desired.

Reference numeral 134 denotes an elongated, substantially hollow inverted frusto-pyramidal seed-discharge guide member. Reference numeral 136 indicates, in general, a substantially C-shaped bracket having a central bight 138 from the opposed ends of which laterally projected a pair of arms 140. Each of the arms 140 terminates in a tab 142 which is fixedly secured to the guide member 134 by conventional means. The bight 138 (see FIGURE 1) is formed with a vertically-elongated slot 144 which receives therethrough an elongated bolt 146 which is threaded into the terminal end section 78 of the lever 72. The arrangement is such as to permit the guide member 134 to be adjusted vertically relative to the lever 72 to serve a function to be described.

As is seen in the drawings, the guide member 134 is inclined at an acute angle with respect to the longitudinal axis of the axle 112, the guide member 134 being so disposed and arranged so as to enter the drum 106 adjacent the upper end thereof with the apex end of the guide member 134 in sliding contact with the inner side of the drum 106. As is seen in the drawings, the open apex end of the guide member 134 is positioned in the path of travel of the openings 108 as the wheel 102 is rotated. The lower end of the seed-discharge tube 30 is loosely inserted within the upper open or base end of the seed guide member 134.

It being understood that one attachment 70 is provided for each plow shoe 22 of the planter 10, the operation of the attachment will now be described.

As the planter 10 is drawn forwardly, that is, to the right as viewed in FIGURES 1 and 2, the plow shoe 22 will open a furrow in advance of the furrow plow blade 60. The furrow plow blade 60 opens a planting drill 200 which is adapted to receive seed from the hopper 28. This is accomplished in the following manner.

The seed disposed within the hopper 28 is metered by conventional means mentioned above for delivery at spaced-time intervals to the delivery tube 30. The seed is discharged from the delivery tube 30 into the upper end of the seed guide member 134 and falls upon the drum 106 at the apex end of the guide member 134. The seed is retained on the drum 106, since the apex end of the guide member 134 is in sliding engagement with the drum, until the open apex end of the guide member 134 is aligned with one of the openings 108. When this alignment occurs, the apex end of the guide member 134 sweeps the seed into the aligned or registered openings 108 and the seed then passes downwardly, under the force of gravity, through the hollow cylindrical tube 128 and the nozzle 132 from whence it is discharged into the seed furrow 200. It will be understood, of course, that the rotational path of the tubes 128 and nozzles 132 is in alignment with the pointed end of the furrow plow blade 60.

The wheels 102 are rotated to sequentially move the openings 108 beneath the apex end of the guide member 134 by means of the feet 126 which engage the ground at one side of the wheel 102.

The metering means for the planter 10 is so adjusted that seed discharge from the hopper 28 will not reach the apex end of the guide member 134 until one of the openings 108 has moved out of registry with the apex end of the guide member 134 and before the next succeeding opening 108 has moved into registry therewith.

FIGURES 5 and 6 illustrate a second embodiment of this invention. The second embodiment differs from the first in but two respects, namely, FIGURES 5 and 6 illustrate but two hollow cylindrical tubes 128 with their associated discharge nozzles 132, these elements being spaced 180° apart, whereas, the wheels 102 shown in FIGURES 1 to 4, inclusive, show the same elements as being spaced 120° apart, and in the means utilized in connecting the legs 124 of the L-shaped lugs 122 to the disc 104. The legs 124, as illustrated in FIGURE 6, are detachably connected to circumferentially-spaced, radially-extending substantially hollow collars 300 by means of screws 302. Thus, the lugs 122 may be used with wheels 102 having diameters of various dimensions.

Of course, the arrangement and disposition of the discharge nozzles 132 and the tubes 128 are not limited to the two or three illustrated herein, since in the practice of this invention, it is contemplated that the number thereof may vary, as desired.

The resilient springs 92 tend to stabilize the attachment 70 in that as the offset feet 126 encounter an obstacle, the shock is substantially absorbed without transmission to the planter, and the nuts 86 effectively prevent any unusual downward movement of the wheels 102 when a depression in the ground is encountered.

Since this invention contemplates the use of wheels 102 of differing diameters, it follows that the diameters of the drums 106 will be greater or lesser. Since the open inner end of the seed-discharge member 134 wipes the inner sides of the drums 106, the member 134 must be adjustable relative thereto. This is accomplished through the slot 144 and the bolt 146.

The discs 46, 48 follow the attachment 70 to close the planted drill.

FIGURES 7 to 9, inclusive, illustrate other embodiments of the attachment wheel. With the exception of the ground-engaging element disclosed in these figures, the attachment is identical to that described above. The principal features distinguishing the wheels of FIGURES 7 to 9, inclusive, from the foregoing embodiments of this invention, reside in the elimination of ground-engaging offset foot element 126 in favor of a substantially linear ground-engaging member. Thus, in FIGURE 7, the ground-engaging members have been designated, in general, by reference numeral 400. Each ground-engaging member 400 is seen to comprise an elongated substantially cylindrical leg 402 which terminates at one of its ends in a laterally-offset foot 404, the degree of angularity therebetween being substantially 90°. The other end of the foot 404 extends into an offset ground-engaging tine 406, the tine 406 having its axis disposed at 90° relative to the axis of the foot 404. As is seen in FIGURE 7, the tine 406 and leg 402 project from the foot 404 in opposite directions and are parallel to one another.

The legs 402 are, optionally, fixedly connected to the disc 104 in circumferentially-spaced relation relative to one another to radiate therefrom or, the legs 402 could be detachably received in the collars 300 if the wheel of FIGURE 6 is to be used.

In the modification as shown in FIGURE 8, the ground-engaging members are designated, in general, by reference numeral 500. As is seen in this figure, each ground-engaging member 500 includes a substantially cylindrical leg 502 and an elongated substantially cylindrical foot 504 integrally formed with one end thereof. The legs 502 of the ground-engaging members 500 are fixedly secured to the disc 104 in circumferentially-spaced relationship relative to one another, and the feet 504 radiate therefrom and extend beyond the drum 106, the longitudinal axes of the feet 504 being disposed at an acute angle relative to the disc 104.

Here, again, and depending upon the length of the legs 502, the ground-engaging members 500 of FIGURE 8 could be substituted for the legs 124 of the ground-engaging members as shown in FIGURE 6.

FIGURE 9 illustrates still another embodiment of this invention wherein the ground-engaging members are designated, in general, by reference numeral 600. The ground-engaging members 600 are substantially cylindrical in configuration and include an elongated substantially rectangular leg 602 terminating, at one of its ends, in a foot 604, the foot 604 having its longitudinal axis disposed at an obtuse angle relative to the longitudinal axis of the leg 602. As is seen in FIGURE 9, the legs 602 may be fixedly secured to the disc 104 in circumferentially-spaced relation relative thereto and radiate therefrom. Optionally, the legs 602 could be releasably connected to the disc 104 by using the collars 300 shown in FIGURE 6.

Having described and illustrated two embodiments of this invention in detail, it will be understood that the same are offered merely by way of example, and that this invention is to be limited only by the scope of the appended claims.

What is claimed is:

1. An article of manufacture comprising an attachment for a seed planter including an elongated lever having a pair of opposed ends, a disc rotatably-mounted on one end of said lever, said disc having a substantially cylindrical drum projecting laterally from the circumferential marginal edge thereof, said drum having a plurality of circumferentially-spaced openings extending transversely therethrough, a plurality of ground-engaging lugs secured to and projecting beyond the outer periphery of said disc and beyond the outer periphery of said drum, said ground-engaging lugs being disposed in circumferentially-spaced relation relative to one another, a substantially hollow tube for each of said openings, said tube having a pair of opposed ends, each of said tubes having one of their respective ends fixedly secured to said drum adjacent the marginal edge of each of said openings and the other ends of said tubes projecting radially away from said drum, a plurality of elongated substantially hollow cylindrical flexible seed-discharge nozzles, there being a flexible seed-discharge nozzle for each of said tubes, each of said flexible seed-discharge nozzles having one of their respective ends fixedly secured to the other ends of said tubes with the other ends of said flexible seed-discharge nozzles extending away from said other ends of said discharge tubes, an elongated substantially hollow seed-discharge member fixedly secured to said lever intermediate its ends, said member having an open seed-discharge end engaging the inner side of said drum and disposed in the path of travel of said openings as said disc is rotated.

2. In a seed planter having a seed hopper, a plow shoe, a plow beam connecting said plow shoe with said planter, frame means connected with said beam and projecting rearwardly of said shoe, a normally horizontal lever having a pair of opposed ends, means pivotally-connecting one of said ends of said lever with said frame means, an axle fixedly-secured to and projecting laterally from the other end of said lever, a disc mounted for rotation on said axle, a plurality of ground-engaging means mounted on said disc and projecting radially beyond the outer periphery thereof, a substantially hollow cylindrical drum fixedly-secured to the circumferential marginal edge of said disc and projecting laterally from a side thereof, said drum having a plurality of circumferentially-spaced openings extending transversely therethrough, a substantially hollow tube for each of said openings, each of said tubes having one of their respective ends fixedly-secured to said drum at the circumferential marginal edge of each of said openings, a substantially hollow elongated flexible discharge nozzle having a pair of opposed ends, one of said ends, respectively, of each of said nozzles being connected with, respectively, the other of said ends of each of said tubes, said other ends of said flexible discharge nozzles projecting away from said drum, a normally upright elongated substantially hollow seed-discharge element having a pair of opposed open ends and being fixedly-connected to said lever intermediate its said ends, one of said ends of said element comprising a seed-discharge end engaging the inner side of said drum and disposed in the path of travel of said openings as said disc is rotated, and means connecting the other end of said hollow seed-discharge element with said hopper to guide seed from said hopper into said element.

(References on following page)

References Cited by the Examiner

UNITED STATES PATENTS

| | | | |
|---|---|---|---|
| 411,913 | 10/1889 | Wilder | 172—534 |
| 1,218,919 | 3/1917 | Youngren | 111—91 |
| 1,334,223 | 3/1920 | Byrd | 222—485 |
| 2,357,760 | 9/1944 | Peacock | 111—85 |

FOREIGN PATENTS 698,467  11/1930  France.

ABRAHAM G. STONE, *Primary Examiner.*
WILLIAM A. SMITH III, *Examiner.*